Sept. 11, 1956  M. H. SWEET  2,762,278
ROTATING LAMP INTENSITY SCALE SENSITOMETER
Filed Dec. 8, 1951  2 Sheets-Sheet 1

INVENTOR
MONROE H. SWEET
BY
ATTORNEYS

Sept. 11, 1956 M. H. SWEET 2,762,278
ROTATING LAMP INTENSITY SCALE SENSITOMETER
Filed Dec. 8, 1951. 2 Sheets-Sheet 2

INVENTOR
MONROE H. SWEET
ATTORNEYS

United States Patent Office 2,762,278
Patented Sept. 11, 1956

2,762,278
ROTATING LAMP INTENSITY SCALE SENSITOMETER

Monroe H. Sweet, Binghamton, N. Y., assignor to General Aniline & Film Corporation, New York, N. Y., a corporation of Delaware Application December 8, 1951, Serial No. 260,685

2 Claims. (Cl. 95—10)

This invention relates to photographic testing apparatus and more particularly to sensitometers for exposing slow speed photo-sensitive materials such as photographic printing paper.

Sensitometers are well known instruments in the photographic art, used to prepare light-sensitive materials especially films or plates with a series of exposures in a definite ratio on different sections of the material, so that the latter may, after development, be evaluated as to its speed and other characteristics.

Sensitometers fall into two general classes, depending upon whether the exposure variation is effected by varying the time of exposure or the intensity at a predetermined rate and are referred to as time scale or intensity scale instruments, respectively. The present invention pertains to intensity scale instruments where the intensity variation is produced by means of a series of screens of known absorbing power, called an optical wedge.

A suitable light source for sensitometers has long been a problem for the reason that it is essential that such source be capable of standardization by being accurately reproducible in intensity as well as spectral distribution and also it must give a constant, unvarying light intensity.

Incandescent electric lamps offer certain advantages in this connection and have been used for this purpose. Generally such lamps must be placed at a relatively great distance from the sensitive material, in order to obtain, by means of elaborate optics, a uniform illumination of the area over which exposure is to be made. In the testing of high speed sensitive material such as film or plate stock the light intensity need not be great and, therefore, much of the available light intensity of the lamp may be expended in the distance due to placement, and in the optics. However, for the testing of printing stock such as paper and slow speed positive film material, much higher light intensity is necessary. This means excessively large lamps at a distance where the useful illumination can be made uniform over the exposure area.

It is also a well known fact that an incandescent lamp does not present a uniform radiation intensity over unit portions of the filament resulting in so-called "hot spots". Uniform illumination in a sensitometer is, of course, an absolute necessity and prior art instruments have made use of only a small portion of the incandescent filament so as to obtain a uniform illumination.

It is the primary object of this invention to provide a sensitometer instrument which will accommodate a conventional incandescent light source placed at a relatively short distance from the exposure plane.

It is another object of this invention to provide a compact intensity scale sensitometer for exposing materials of low sensitivity and making use of the total illumination of the incandescent filament as the light source.

A particular feature of the invention is that substantially uniform illumination may be obtained at the exposure plane with an incandescent light source without the use of optical devices.

Other objects and features will be apparent from the following description of the invention, pointed out in particularity in the appended claims and taken in connection with the accompanying drawings in which:

Figure 1:
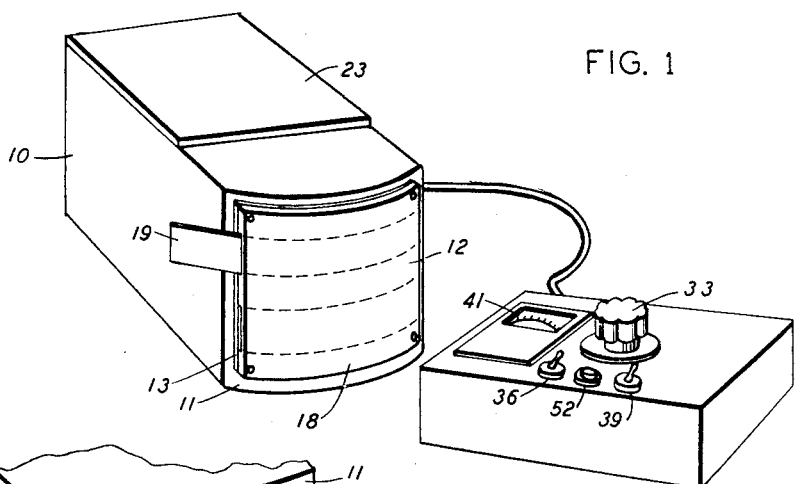
Figure 1 is a perspective view of the sensitometer together with the control unit for its operation.
Figure 3:
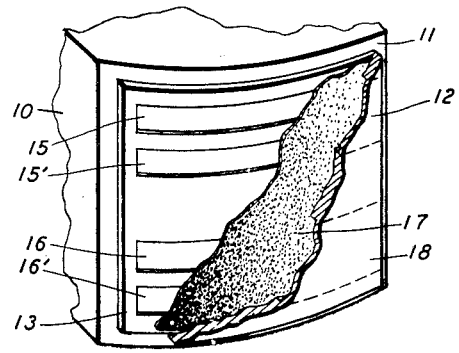
Figure 3 is an enlarged perspective view of the front portion partly cut away to show the specimen holder and the optical wedge.

Referring to the figures, the instrument comprises a casing 10 forming an oblong box-like structure which may be made of plastic or any other suitable opaque material. The front wall 11 is curved and affixed thereto is the holder assembly 12 which accommodates strips of the material to be tested. This assembly consists of the plate 13 which has two sets of exposure openings in the form of parallel slots 15, 15′, 16 and 16′. Over the plate 13 is the light absorbing optical wedge 17 which may have either a continuously varying density in the horizontal plane or it may consist of a series of elements each having a higher density distributed in the same plane, known as a step wedge.

The wedge 17 determines the intensity scale for the graduated exposures. Over the wedge 17 is the specimen holder plate 18 which has channels adjacent the exposure openings in the plate 13 so as to accommodate a strip of the sensitized material 19 which can be conveniently slid into the holder assembly 12 as seen in Figure 1.

Figure 2:
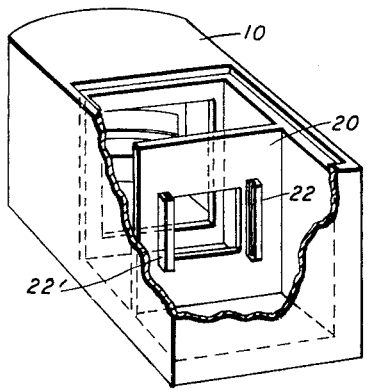
Figure 2 is a perspective view taken from the rear of the instrument with the cover removed and portions of the wall cut off to show the internal construction of the partitions and the filter holder.
Figure 4:
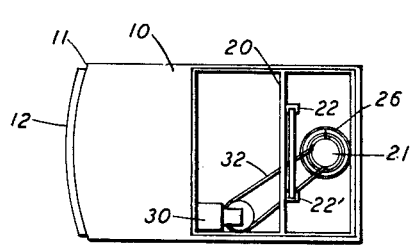
Figure 4 is a top view with the cover removed showing the placement of the light source and the driving motor.
Figure 5:
Figure 5 shows the simple filter for the holder seen in Figure 2.

The casing 10 as seen in Figures 2 and 4 is divided into compartments. The dividing wall 20 has an opening of sufficient size to pass the light from the lamp 21 located in the rear compartment unobstructed to the exposure slots 15 and 16. A simple holder for a filter shown in Figure 5 is provided by the grooved frame members 22 and 22′ mounted on the wall 20.

The inside construction is easily accessible by removing the cover 23 of the casing 10 so that a filter may be inserted or a lamp replaced. The filter used may comprise simple glass plates or suitably mounted film material. These can be of the neutral density type to attenuate the incident light flux so as to obtain various energy levels in testing materials of higher sensitivity or the filter may be colored for testing the spectral response of the material.

In the rear compartment is located the light source comprising a conventional incandescent lamp 21. The location of the lamp as to distance from the holder assembly 12 is interrelated to the arcuate shape of the latter; the lamp being in the center of curvature of the plate 13. This construction avoids the uneven light intensity conditions due to a plane exposure surface. In conventional instruments the use of a wedge in a plane involves problems regarding the inverse square law since under this condition the distance from the light source to each end of the wedge is greater than the distance from the light source to the center of the wedge. Moreover, the angle at which the radiation strikes the wedge and the photographic material is acute at all parts of the strip except in the center and therefore the effective energy incident on the material is less at the ends than at the center. In order to avoid the undesirable effects resulting from this condition the light source is generally placed at least three feet from the plane of the test material. With the light source so far removed from the plane of the material the flux density is only $\frac{1}{100}$ of that available at the distance of approximately 4 inches.

Placing the lamp 21 in accordance with this invention in the center of curvature of an arcuate exposure plane has the advantage of shortening the distance between the light source and the material to approximately $\frac{1}{3}$ and results in a gain of fourfold in light intensity as well as in a smaller and compact assembly. This construction alone does not offer a complete solution of the problem of uniform light energy distribution at the exposure plane. The flux distribution pattern of an incandescent lamp, due to the shadow cast by the filament support and irregularities of the filament, must be taken into consideration. These irregularities are marked enough that a separate calibration of the contours would be necessary for each individual lamp. Such a calibration would have to be made every time the lamps are changed making standardization extremely difficult, if not impossible. This disadvantage is overcome in accordance with the present invention by rotating the lamp about its axis during exposure cycles. In this way every point on each horizontal section of the semi-cylindrical surface in the exposure plane receives identical incident flux density when averaged over a predetermined exposure time interval. Vertical maldistribution of light flux is not a serious problem because the integrated flux throughout each horizontal plane does not vary greatly over the limited vertical displacement involved.

Figure 7:
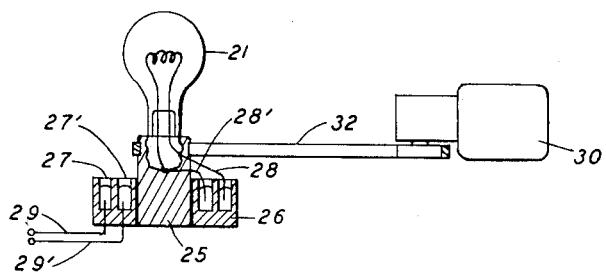
Figure 7 shows the incandescent lamp mounted in a special revolving socket which is driven by a motor.

Rotation of the light source can be effected in various ways. As seen in Figure 7, the lamp 21 fits into a vertically extending shaft 25 which at its upper end is fitted with a standard socket. The shaft 25 rotates in a base 26 which may be secured in any suitable manner in the rear compartment of the housing 10.

In order to maintain stability of energy output of the rotating lamp 21 it is preferable to conduct current thereto by means of a mercury pool contactor instead of the more conventional brush and slip ring contacts employed in rotating electrical machinery. For this purpose the base 26 may be made of suitable insulating material with proper concentric channels 27 and 27' to accommodate the mercury in which the terminal lead wires 28 and 28' ride. The supply leads 29 and 29' terminating in their respective channels are brought out from the base for connection to the supply and control mechanism. A fractional horsepower electric motor 30 located in the middle compartment is arranged to drive the lamp 21 by means of a V-belt 32 seating in a suitable groove over the shaft 25.

The simple drive for the lamp 21 is shown by way of example, and may well be modified as the case may be. The essential feature is that the light source, in the form of a standard incandescent electric lamp, be rotated at a certain speed and that the electrical energy supplied to the lamp, while it is rotated, should in no way be varied due to contact variations in the current transfer mechanism. In a practical embodiment it was found that a photoflood type of lamp, rated at 250 watts, placed at a distance of 18 inches from the test strip and rotating at 120 R. P. M. gave excellent results, accommodating sensitized materials of a wide variety in speed by proper selections of the exciting voltage for the lamp and the duration of exposure.

Figure 6:
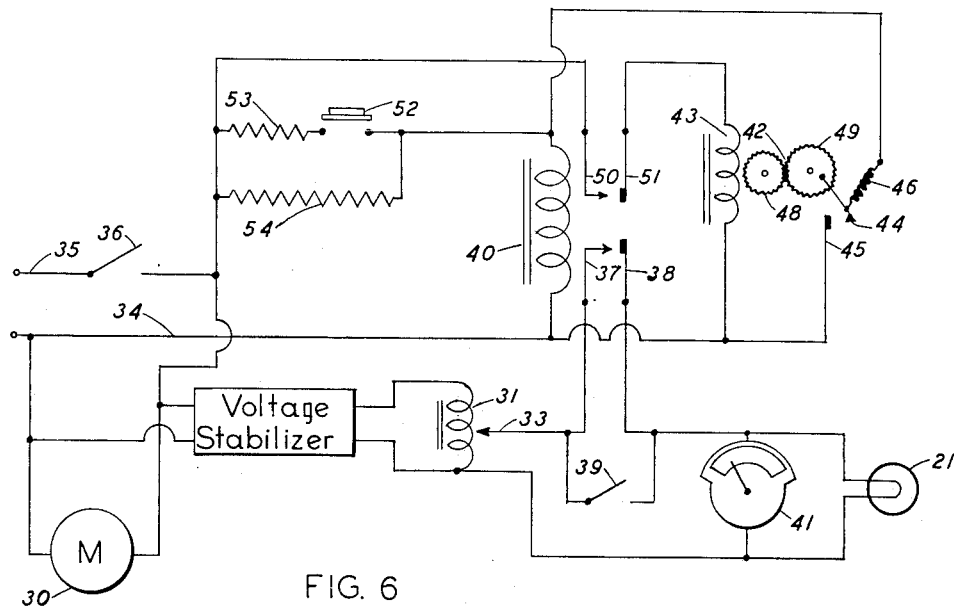
Figure 6 is a circuit diagram of the control mechanism.

An example of a suitable control unit to obtain timing of the exposure and adjustment of the light intensity, as seen in Figure 6, includes a voltage stabilizer feeding an adjustable autotransformer 31 for supplying the current to the lamp 21. The lamp supply circuit is connected to the power line 34 and 35 controlled by the main switch 36. In parallel with this circuit is also the motor 30 for rotating the lamp 21. Current to the lamp is controlled by contacts 37 and 38 of the relay 40; there being also a suitable voltmeter 41 placed in shunt with the filament of the lamp 21 to indicate the excitation voltage derived from the autotransformer 31. A manually operable switch 39 is placed in shunt with the contacts 37 and 38 for energizing the lamp circuit independently from the operation of the control relay 40.

The relay 40 functions as a timing mechanism in connection with a motor driven contactor 42. The latter consists of a field winding 43 for a shaded pole type synchronous motor which drives the adjustable contacts 44 and 45 of which the contact 44 is biased by the spring 46 so as to open the circuit when winding 43 is deenergized. The rotor 48 of the timing mechanism 42 drives the contactor actuating wheel 49 and the time of contact making depends upon the setting of the wheel 49 with respect to the distance between contacts 44 and 45.

The timing mechanism 42 is also controlled by the relay 40 in that contacts 50 and 51 complete the circuit from the line 35 to the winding 43 which is directly connected to the line 34. The energizing of the relay is controlled by the push button switch 52 which connects the winding of the relay 40, through a suitable series resistance 53 to the line 35, the other terminal of the winding being connected directly to line 34. A bridge circuit is provided across the switch 52 by means of a fixed resistance 54, the purpose of which will be explained in connection with the description of the operation of the control circuit.

In the operation of the sensitometer the switch 36 is closed whereby the motor 30 becomes energized causing the lamp 21 to rotate at a specified speed. In order to determine the light intensity at which tests are to be made the operator closes the switch 39 and adjusts the rider 33 of the autotransformer 31 to the particular voltage indication which will furnish the lamp 21 the required current for the desired light energy. The switch 39 is then opened which will extinguish the lamp 21 without disturbing the operational settings.

Strips of sensitized material to be tested are placed into the channels provided in the holder assembly 12 whereby this material is in firm contact with the optical wedge adjacent thereto. The desired exposure time is now established by turning the wheel 49 to a position which is generally indicated by suitable graduations denoting a time scale. The switch 52 is then momentarily closed completing the circuit to the winding of the relay 40 through the resistor 53. The value of this resistor is so calculated as to permit sufficient current to pass through the relay winding to close the contacts 37, 38, 50 and 51 respectively. At the instant of closure of these contacts the lamp 21 is energized and the time mechanism 42 activated. When the push button switch 52 is released, the current through the resistor 54 although diminished is sufficient to hold the relay contacts in a closed position. Consequently, until such time as it requires for the wheel 49 to establish closure between contacts 44 and 45 the lamp 21 remains energized while it is also rotated by the motor 30. As soon as the contacts 44 and 45 close, the winding of the relay 40 becomes short circuited resulting in release of the contacts 37, 38, 50 and 51. The timing mechanism is now deenergized and the lamp circuit is also opened.

The spring biased contact 44 also opens as soon as there is no motive force to hold the wheel 49 in the engagement position of this contact releasing the short circuit of the winding of the relay 40. Resistor 54 remains in circuit with the winding of the relay 40 but the current therethrough is insufficient for actuating the contacts of this relay although such current is sufficient to hold the contacts closed once the relay has been energized. The sequence of operation may at any time be repeated by simply momentarily closing the switch 52. As stated before the rotation of the lamp is at a predetermined speed which is so chosen as to provide at least one but preferably several revolutions of the lamp for the shortest possible time of exposure, thereby to assure that each and every point on the same horizontal plane of the explosure surface receives an identical total illumination. In other words, any uneven illumination due to the configuration of the filament or the shadows cast by supports thereof is avoided and such varying intensity integrated to a total illumination which is uniform for all durations of exposure.

I claim:

1. In a sensitometer test apparatus a housing forming a light tight enclosure, an arcuate shaped front wall having a plurality of horizontally extending slits, an arcuate cover for said wall having channels corresponding to said slits and adapted to slidably accommodate photographic strip material to be tested, a translucent screen between said wall and said cover forming an optical wedge varying in density in the direction parallel to said slits, a rotatably mounted light source within said housing located substantially at the center of curvature of said arcuate wall, motor means coupled to said light source for rotating it whereby to sweep said strips for light exposure through said screen, and control means for energizing said source for a time duration longer than the elapsed time of one revolution of said source.

2. In a sensitometer test apparatus a housing forming a light tight enclosure, an arcuate shaped front wall having a plurality of horizontally extending slits, an arcuate cover for said wall having channels corresponding to said slits and adapted to slidably accommodate photographic strip material to be tested, a translucent screen between said wall and said cover forming an optical wedge varying in density in the direction parallel to said slits, a dividing wall having an opening in said housing forming two compartments, a rotatably mounted light source in the rearmost compartment behind said opening and substantially at the center of curvature of said arcuate wall a holder affixed to said dividing wall around said opening for accommodating light filters, motor means coupled to said light source for rotating it whereby to sweep said strips for light exposure through said filter in said holder and through said screen, and control means for energizing said source for a time duration longer than the elapsed time of one revolution of said source.

References Cited in the file of this patent

UNITED STATES PATENTS 1,953,471   Eich ------------------ Apr. 3, 1934

FOREIGN PATENTS 718,969   Germany -------------- Mar. 25, 1942

OTHER REFERENCES

"Photometry" Textbook by Walsh (1926), published in New York, New York. Pages 202 through 204.

Leeds and Northrup Catalog E-72 (1940), 20 pages; pages 5 through 7 cited.